United States Patent [19]

Citron

[11] 4,223,058
[45] Sep. 16, 1980

[54] MATERIAL FOR USE IN FRAMING PICTURES AND DOCUMENTS

[76] Inventor: Samuel Citron, 26 Templeton Pkwy., Watertown, Mass. 02172

[21] Appl. No.: 3,216

[22] Filed: Jan. 15, 1979

Related U.S. Application Data

[63] Continuation-in-part of Ser. No. 845,617, Oct. 26, 1977, abandoned, which is a continuation of Ser. No. 754,183, Dec. 27, 1976, abandoned.

[51] Int. Cl.² .............................................. B32B 3/10
[52] U.S. Cl. .................................... 428/189; 428/190; 428/191; 428/192; 428/203; 428/204; 428/207; 428/212
[58] Field of Search ............... 428/189, 190, 191, 192, 428/203, 204, 207, 212

[56] References Cited

U.S. PATENT DOCUMENTS

| 3,650,794 | 3/1972 | Steinbach | 428/43 |
| 3,874,893 | 4/1975 | Cherrin | 428/189 |
| 3,930,069 | 12/1975 | Stephens | 427/282 |
| 4,082,875 | 4/1978 | Citron | 428/189 |

*Primary Examiner*—Marion McCamish

[57] ABSTRACT

A tape for use in securing a sheet to a surface has adhesive extending part way across one face and the full length thereof with the uncoated portion to overlie the margin of the sheet. The adhesive is colored and disposed to establish a lengthwise demarcation between the coated and uncoated portions and the tape is sufficiently translucent to enable said adhesive to be seen through the tape thus enabling the tape to be applied without the adhesive in contact with the sheet being secured.

4 Claims, 3 Drawing Figures

MATERIAL FOR USE IN FRAMING PICTURES AND DOCUMENTS

The present application is a Continuation-in-part of Ser. No. 845,617, filed Oct. 26, 1977, now abandoned, which was a Contination of Ser. No. 754,183, filed Dec. 27, 1976, now abandoned.

BACKGROUND REFERENCES

United States Letters Pat. No. 3,650,794
United States Letters Pat. No. 3,874,893
United States Letters Pat. No. 3,930,069

BACKGROUND OF THE INVENTION

While a wide variety of picture frames are available that are relatively inexpensive, it is often impossible to find one of a size appropriate for the picture, document, paper currency of collectors, or other paper sheet that is either to be protected by framing or framed so that it can be exhibited on a wall, for example, or in an album or book. In addition, such frames are relatively thick and if to be mounted on the wall, a hanger must be used.

While it is a common practice to use adhesive tapes to secure a sheet to a surface, as far as I am aware there is no tape, other than that in accordance with my U.S. Pat. No. 4,082,875, available that enables a sheet to be so secured without the tape adhering to the sheet and that is suitable for forming a frame.

THE PRESENT INVENTION

The general objective of the present invention is to provide a tape for use in attaching a sheet to a surface with the tape adapted to form a frame freely but securely retaining margins of the sheet.

In accordance with the invention, this objective is attained with a tape having an adhesive coat on one face that extends the full length thereof and from one edge part way across that face with the uncoated portion thereof to overlie a margin of the sheet to be secured. The adhesive is colored and the tape if sufficiently transluscent to enable the adhesive to be seen through the tape. The demarcation between the coated and uncoated portion of the tape can thus be precisely located with reference to the sheet to be secured or in forming the frame therefor while the color of the tape makes the frame stand out and usually matching that of other nearby frames. The tape may be colored or printed provided that the adhesive is still readily visible.

BRIEF DESCRIPTION OF THE DRAWINGS

The accompanying drawings illustrate preferred embodiments of the invention and

THE PREFERRED EMBODIMENTS OF THE INVENTION

Figure 1:
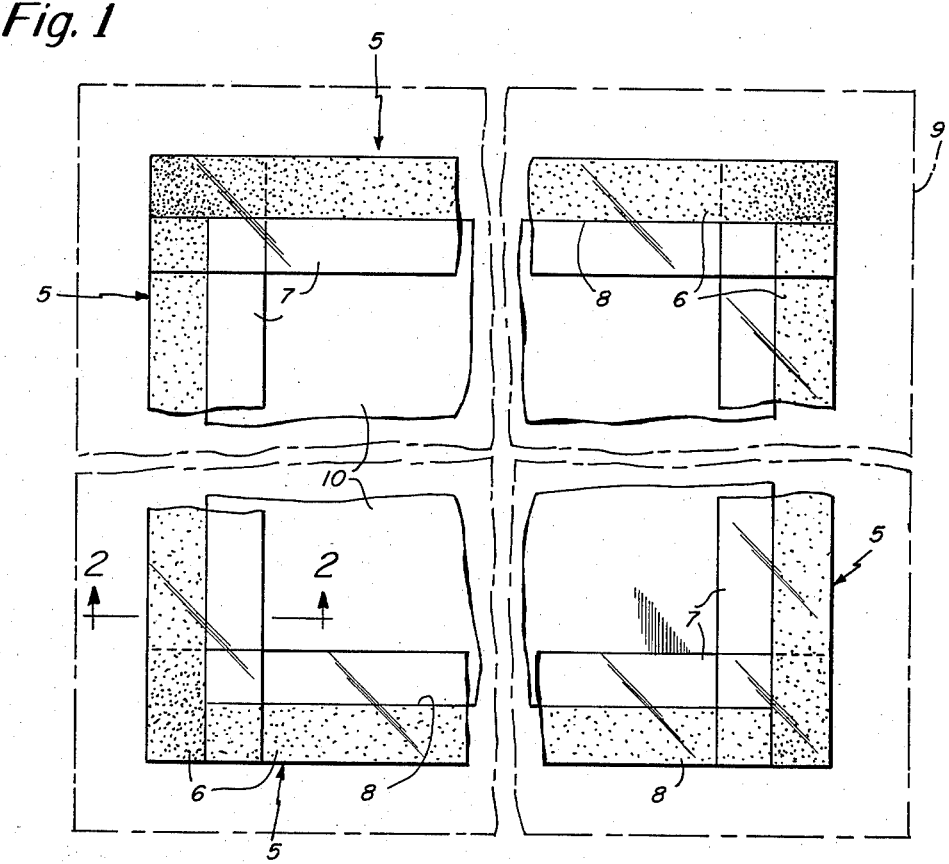
FIG. 1 is a plan view of a frame formed by a tape in accordance with the invention.
Figure 2:
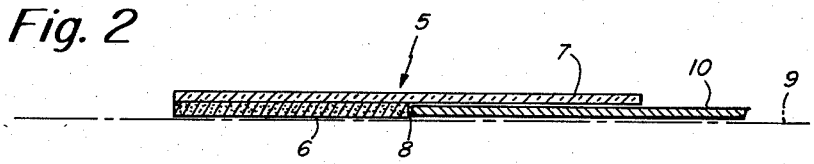
FIG. 2 is a section, on an increase in scale, taken approximately along the indicated line 2—2 of FIG. 1.

The tape illustrated by FIGS. 1 and 2 is generally indicated at 5 and is substantially transparent. One face of the tape 5 is provided with a colored adhesive coat 6 that extends the full length thereof and from one edge part way across that face thus leaving an uncoated portion 7 with a straight demarcation between the coated and uncoated portions. The tape 5 can thus be secured to a surface 9 with its uncoated portion overlying a margin of a sheet 10 without adhesive in contact therewith as the colored adhesive is visible through the tape 5 enabling the tape to be applied with the inner edge of the adhesive 6 abutting an edge of the sheet 10.

The sheet 10 may be a document or a picture to name but two of many examples. Assuming that the surface 9 is a wall and that the sheet 10 is a print to be displayed thereon, it may be easily and attractively framed with the tape 5 by first cutting from a roll a length of the tape that is appropriate for the bottom of the frame which can then be secured horizontally to the wall in a selected position. Usually another length of the tape is then cut and secured to the wall in a position such that it constitutes one side of the frame. With the ends of the tape lengths cut square, the thus established frame side is easily secured at right angles to the first secured tape length. The print 10 may then be inserted under the uncoated free portion 7 of the partly formed frame and seated against the inner edges of the secured frame forming lengths. Another length of the tape appropriate for either the other side of the frame or the top thereof is then cut and applied. As the demarcation between the coated and uncoated portions is visible, the last named tape length and the final frame-completing tape length may be precisely applied with the inner margin of the adhesive of each length abutting an edge of the print 10.

The color of the adhesive is appropriate for a picture frame and the width of the tape 5 is such that the colored portion is consistent with frames for like sized pictures.

Figure 3:
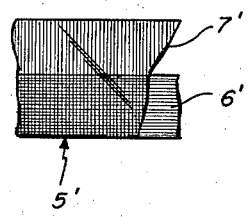
FIG. 3 is a fragmentary plan view of a tape in accordance with another embodiment of the invention.

The tape 5' illustrated by FIG. 3 is generally similar and corresponding parts will not again be described. In FIG. 3 the tape 5' is transluscent so that the colored adhesive coated portion 6' from the non-adhesive area 7' is easily distinguished. In practice, the tape is itself colored but it may be printed, for one example to present the appearance of wood.

I claim:

1. A tape for use in attaching a sheet to a surface, said tape including an adhesive coat on one face that extends the full length thereof and from one edge part way across said one face with the uncoated portion of said one face to overlie a margin of said sheet, said adhesive colored and disposed to establish a straight and continuous demarcation between the coated and uncoated portions of said one face that parallels the edges of said tape, said tape at least sufficiently transluscent to enable said adhesive portion to be observed through said tape thus to enable said tape to be applied against the surface along a margin of the sheet with the inner edge of the adhesive substantially in abutment with the edge of said margin but without adhesive contacting said sheet or to establish a frame the sheet receiving dimensions of which are established by said lines.

2. The tape of claim 1 in which the tape is transparent.

3. The tape of claim 1 in which the tape is colored, the color of the adhesive distinguishable from that of the tape.

4. the tape of claim 1 in which the other face of the tape is printed.

* * * * *

UNITED STATES PATENT AND TRADEMARK OFFICE
CERTIFICATE OF CORRECTION

PATENT NO. : 4,223,058
DATED : September 16, 1980
INVENTOR(S) : Samuel Citron

It is certified that error appears in the above—identified patent and that said Letters Patent is hereby corrected as shown below:

Column 1, line 41, After "tape" the word "if" should be --is--.

Signed and Sealed this

Seventeenth Day of November 1981

[SEAL]

Attest:

GERALD J. MOSSINGHOFF

*Attesting Officer* — *Commissioner of Patents and Trademarks*